United States Patent Office 3,079,243
Patented Feb. 26, 1963

3,079,243
ABRASIVE GRAIN
Herbert F. G. Ueltz, Shrewsbury, Mass., assignor to Norton Company, Worcester, Mass., a corporation of Massachusetts
No Drawing. Filed Oct. 19, 1959, Ser. No. 847,094
14 Claims. (Cl. 51—298)

This invention relates to abrasive grains and more particularly to an improved form of abrasive grains resulting from sintering a natural bauxite to produce such grains.

In the past various treatments have been proposed for the processing of natural bauxites including sintering such materials to produce wear resistant objects and abrasives. All of these developments, however, have contemplated the production of a molded body of relatively large size having special usefulness or being in the form of bricks adapted to be crushed after sintering to produce the desired abrasive grains.

Although abrasive grains such as those produced in following the teaching contained in Coes Patent 2,725,286, have demonstrated advantages for certain types of grinding operations, I have discovered, by following the teaching herein described, that a still better abrasive product can be produced. My abrasive, like Coes', is especially well suited for use in heavy duty snagging grinding operations, and it has been demonstrated in grinding tests that grain produced in accordance with my invention has a greatly improved grinding ability over all known prior art abrasives.

As distinguished from known teachings, and when following my invention, natural bauxite material after being subjected to a preliminary treatment, is formed into agglomerated masses of particles having the desired range of grain sizes for my abrasive. The agglomerated masses are then subjected to a sintering step to produce the finished abrasive grain.

As taught in Coes, it has heretofore been thought to be necessary to crush a fired abrasive composition and screen the crushed material to size it for use in grinding wheels. This prior art procedure results in the waste of fines that cannot be easily recycled and further the very act of crushing a hardened grain seems to produce weaker shapes of grains.

My grains are formed directly to size and are preferably given a strong shape prior to the firing or sintering step. The grains of my invention not only can be made without performance of the difficult crushing and screening of a hardened abrasive as is typical of the prior art, but also it has been found that the abrasive grains of my invention may be incorporated in a resinoid snagging wheel, for example, to produce a much larger quantity of stock removal relative to wheel wear when compared with any of the known snagging abrasives used heretofore.

Briefly, my invention makes use of a calcined natural bauxite as a starting material. Such a bauxite is reduced to a powder form having a very small average particle size. Prior to sintering, the powdered bauxite is compacted and formed into agglomerated masses of particles, each individual mass of such particles being graded to be of a size to fall within a range approximately the same as or slightly larger than the desired size range and distribution of sizes that may be required in the finished abrasive grain.

The "green" agglomerated masses of particles are preferably formed prior to sintering to have the strongest grain shape consistent with the use to which the finished product is to be put, which shape, in the case of snagging grains, is thought to be generally spherical but having a sufficiently knobby surface configuration to make possible a strong bond with the resin or other bonding agent selected. The shaped and sized grains are then sintered at an optimum temperature below the fusion temperature for the bauxite to produce a controlled degree of recrystallization within the grains, the sintering being continued for a time period sufficient to complete the formation of my abrasive grains. The finished grains may then again be screened and sized as required for the particular use for which the grain is designed. A more detailed description of my invention follows.

In the manufacture of my abrasive product, the natural bauxite, as mined, is preferably subjected to calcination and rough crushing steps. Usually calcining is done at the mine site and there the dehydrated bauxite is crushed to a size range of roughly 1" lumps or finer. I have successfully used Demerara, Surinam bauxites as well as both the Domestic and Metal grades of Arkansas bauxite. Their ores are readily available and upon reference to the specification below wherein the limiting factors will be spelled out, by simple experiments, it will be seen that a trained chemist will be able to predict or forecast other natural bauxites that could be used.

The following data show the ranges of analyses of bauxites like those with which I worked. It is known that compositions of natural bauxites vary widely even varying within different areas at the same mining site, as to the proportion of aluminum oxide present along with other compounds and, therefore, the following tabulation should be considered only as broadly typical of the compositions of the types of bauxites used to produce satisfactory abrasive grains.

CALCINED BAUXITE ANALYSES

| Type | $SiO_2$ | $Fe_2O_3$ | $TiO_2$ | $Al_2O_3+H_2O$ | Loss on Ignition At About 1,000° C. | CaO | MgO | $Na_2O$ |
|---|---|---|---|---|---|---|---|---|
| Arkansas | 4.16 to 5.49 | 2.68 to 8.65 | 2.24 to 2.66 | 79.98 to 92.82 | .10 to .34 | 0.12 to 0.25 | 0.09 to 0.24 | 0.01 to 0.06 |
| Demerara | 5.65 to 6.14 | 1.41 to 1.65 | 2.75 to 3.09 | 89.01 to 89.17 | 0.16 to 1.32 | 0.21 | 0.28 | 0.08 |
| Surinam | 3.06 to 4.01 | 2.26 to 4.85 | 3.18 to 3.50 | 89.17 to 89.44 | 0.34 to 1.61 | 0.05 | 0.23 | |

The calcined natural bauxite is then subjected to a further crushing or other suitable procedure to reduce it to an approximate size such that it would if screened pass through about a 16 mesh screen or finer. The material at this stage need not be screened and a rough sizing in the order of 16 mesh can be accomplished with one pass through a suitable roll crushing mill wherein the rolls are relatively fixed tightly together.

The crushed bauxite may then be further reduced in particle size such as by ball milling and for this purpose the crushed bauxite is preferably made into a slurry with approximately equal weights of water and bauxite to produce a proper consistency within the charge being fed to the ball milling operation. The bauxites of the kind listed above may be subjected to ball milling in a conventional type of mill such as a 30" x 30" porcelain lined mill driven to rotate at about 35 r.p.m. This type of mill may be charged with 600 lbs. of alumina balls, 160 lbs. of water and 150 lbs. of roll-crushed bauxite and the mill driven for a period of up to 24 hours during which time the crushed bauxite particles are further reduced in size to have an average particle size which is believed to be in the order of 4 to 5 microns. The ball milling operation should be continued only so long as is necessary depending upon the end use of the product. For certain use particle size distribution may not be too critical while for other uses the milling should be continued until the actual particle size distribution ranges from below one micron upwardly to the order of 10 to 12 microns with a considerable proportion below 4 microns in size. For producing a snagging abrasive, it has been found, when there is any substantial proportion of particles larger than 12 microns, that the grains produced from a powder containing such particles in excess, does not give the best grinding action. The size of the particles of the order of those produced by a ball milling operation such as described above, may be seen in and approximately measured for size, in a Reichert projecting microscope having an objective of 100 power, which gives an image magnified 1000 times.

It is suggested that other methods or means may be used to reduce the crushed bauxite material to the very fine sized particles needed. Jet milling under air pressure may be used to reduce the preliminarily crushed product in a known manner. Dry ball milling and possibly other milling systems coupled with suitable agitation and control can be foreseen, which can be adapted to the production of a proper range of particle sizes and shaped similar to the particles produced by wet ball milling, which other systems shall fall within the contemplation of this invention.

Where wet ball milling is used, the slurry of milled bauxite particles flows from the mill and the slurry is then dried. Depending upon the characteristics of the particular bauxite more or less water is used to produce the best viscosity for ball milling. The slurry may be dried in any conventional way such as by evaporation and, at a temperature of approximately 85° C., a four or five inch layer of the slurry can be dried in about 48 hours in a normal atmosphere. Procedures such as filtering may be used to speed up the drying process or alternatively a drum dryer or other drying means may be used.

The thus dried bauxite is usually in the form of a soft cake or contains soft lumps which are easily broken down by being run through a roll crusher. A uniformly fine dry powder falls from the crusher to be subjected to forming into grain sized masses by further processing.

This powder, or one corresponding to that produced by wet ball milling and subsequent drying, may then be subjected to a compacting and forming procedure to agglomerate given masses of the particles into self-sustaining bodies. The compacting and forming of this powder which is not free flowing can be performed in one of several different ways.

I prefer to subject measured quantities of the powder to a pressing means adapted to produce a pressure of up to about five tons per square inch which mechanically presses the particles into a state where substantially all of the particles are in contact with all of the next adjacent particles in the mass insofar as this is possible whereby crystal growth is promoted at the points of contact. Pressures higher than 5 tons per square inch do not seem to produce any noticeable effect in the final product and yet the pressure should be of this order to make as dense a compacted product as possible. The powdered material agglomerated in this manner has sufficient mechanical strength to be self-sustaining through all of the remaining stages of treatment.

In the procedure which I have practiced to date, cakes of the powdered bauxite material, approximately 7" in diameter and 1½" thick have been prepared by placing the powder in a suitable mold on a hydraulic press and after several bumping steps, subjecting it to a pressure in the order of 5 tons per square inch. The "green" cake so produced may show some pressing laminations but since it is then run through a suitably adjusted jaw or other conventional granulator to reduce the 7" cake to smaller sized masses of agglomerated particles, this stratification is not objectionable. These green cakes have been found to have such a physical composition for example that they be manually hammered on an oscillating screen to break them down to the required granular size.

The agglomerated masses of particles resulting from crushing the green cake are then screened and graded. The granules passing through a 6 mesh screen and retained on a 16 mesh screen are in the size range normally used for certain types of abrasive grains, and such masses of agglomerated particles of pressed crushed bauxite powder are collected, the other green screenings being recycled. Several screening procedures have been used, the most satisfactory being a rotary or gyratory screen which serves to simultaneously grade and shape the grains by the tumbling action. If other sizing means are used, it may be desirable to tumble the green masses in a barrel to round them up prior to sintering.

The finely ground powder has also been formed into agglomerated masses of particles by a very high pressure extrusion process. In this instance a temporary organic binder in the form of dextrin or a grease product may be used which burns out of the product when it is fired. Care must be exercised in the selection of the binder, however, to make certain that the one selected does not interfere with recrystallization and permits the fine particles to be pressed into intimate contact one with another. A bauxite powder mixed with one such binder has been successfully extruded through a round orifice 0.120" in diameter. The resulting strings can be cut into grain sized lengths and the pieces tumbled to improve their shape for sintering.

Other grain sized aglglomerations of particles have been made directly by formation in rubber molds which can be trapped to enclose the powder and produce a hydrostatic pressure on it. Since any degree of pressure can be produced in such a molding means, temporary binders are not needed in this instance. Also the compacted and formed masses can easily be stripped from the rubber mold by turning the mold inside out.

A Stokes pill pressing machine has also been used to produce the desired agglomerated masses. Since the powdered bauxite is not free flowing, however, and in view of the relatively small size of the agglomerated masses, the other compacting and forming procedures are preferred.

The collected agglomerated masses if necessary, are subjected to further processing to shape the discrete masses to produce strong shapes of grains. The preferred shape is approximately spherical, but with the individual grains having sufficient knobbiness to effect a strong engagement of the grain within the bond. Tumbling the screened masses against each other in a barrel for about 20 minutes has been found to be quite effective for properly shaping grains produced from a pressed green brick. It has been suggested above that shaping can be accomplished simultaneously with the screening of the grains on rotary screens or on other power driven oscillating or gyratory screens. The fines produced in this crushing, screening, and shaping procedure can be directly recycled to the roll crushing infeed, and it has been found in following the preferred pressing, crushing, screening and shaping steps outlined above, that a yield of approximately 55 to 68% of "green" agglomerated masses of fine particles is produced.

The green grains are then ready to be fired at a sintering temperature which is usually different and may be determined for each bauxite subjected to this type of processing. With the several different bauxites with which I have worked, the optimum sintering temperature has fallen within the range of from 1375° C. to 1570° C. The temperature at which a particular bauxite may be sintered, can be varied, but as long as sintering is accomplished within a range of degrees on one side or the other of the optimum temperature at which the bauxite particles can be effectively recrystallized, improved results can be obtained. It should be noted that my suggested sintering temperatures for each bauxite, as will appear fully hereinafter, are below the fusion temperature for that bauxite. The sintering temperature controls the rate of recrystallization to a great degree but the length of time the grain sized masses are exposed to heat at a given temperature also has a bearing but is much less critical than is the temperature selected. Thus effective recrystallization can be accomplished at a sintering temperature of 1425° C. with a soak period of from 10 to 20 hours and the same bauxite has been effectively treated at 1570° C. for 15 minutes to produce a good high density grain.

The sintering may be accomplished in various ways and I have found that in making use of a tunnel kiln, the grains can be arranged in a 4″ deep layer in a suitable sagger for passage through the kiln. In passing through such a kiln the grains are subjected to a range of temperatures up to the sintering temperature and are held at the sintering temperature for a minimum period of about four to five hours. The resulting sintered grain may be easily removed from the sagger after cooling, and it will be found that the individual grains have been converted into a hardened abrasive product having unusually good properties for snagging operations. The grains in the sagger will be found to be loosely bonded to each other but the grains may be easily broken apart one from another by a slight degree of pressure such as in the order of that which may be produced by squeezing the grains which are stuck together in one's hand.

I have produced satisfactory grain in an electric resistance furnace as well as a gas fired furnace. Excellent sintered grain from Demerara bauxite was obtained by continuously feeding a stream of the grain sized agglomerates through a gas fired rotary kiln where they were fired at a mean temperature of about 1570° C. The grain was passed through the rotary kiln in 15 minutes or less. In this last instance the grains tumbled through the kiln during firing and no sticking was encountered.

Regardless of the sintering temperature and time period used to complete the desired recrystallization, it has been found that when the particles within the mass of the grains are in proper contact at the start of the sintering step, about a 20% linear shrinkage occurs. This is caused by the particles within the agglomerated masses actually reforming to produce crystals of larger size than the particles themselves with the result that the particles consolidate into the more compact crystalline form.

Grains produced in following my teaching are usually graded within a size range of from 10 to 20 mesh grain for use in snagging grinding. Such grains are bonded in a resin bond and may otherwise be incorporated in a grinding wheel in following the conventional teachings for use of snagging abrasives. The grains of my invention work equally well in all kinds of snagging grinding wheels including those making use of well known fillers which increase the efficiency of the snagging grinding operation.

In practicing my invention I have made grains from bauxite mined in Arkansas, Surinam, and that which comes from along the Demerara River. The Arkansas bauxite may be further classified into the Domestic grade and Metal grade. All of these bauxite materials gave improved results compared with abrasive grains produced from the same material by prior art procedures. Typical composition ranges for given samples of these bauxites have been set forth above.

My tests show that each of these natural bauxite materials, when powdered and formed into agglomerated masses, has an optimum sintering temperature as follows:

Arkansas: ° C.
    Metal grade _____ 1410
    Domestic grade _____ 1375
Demerara _____ 1570
Surinam _____ 1505

As stated above the sintering temperature for each bauxite is somewhat critical and while the agglomerated masses may be sintered at a temperature varied somewhat from those named above, the time of exposure of the grain to heat at the temperature is much less critical. The important fact is that sintering is to be performed at a temperature below the fusion temperature for the particular bauxite and for a sufficient time period to effect an effective degree of recrystallization to produce a fine grained uniform appearing micro-crystalline structure within the mass of each of the grains.

The densities of the resulting grains will vary considerably depending upon the porosity of the grain, if the grain is subjected to mechanical pressure, the porosity will in part depend upon the degree of pressure used to compact the grain, and the porosity also depends somewhat upon the kind and amount of the impurities present in the natural bauxite. Density of the fired grain is an important property indicative of the quality of my resulting product, which may be measured or approximated in several ways, for the purposes of my tests the Pycnometric method seems best. To find approximately the maximum theoretical density by this system, the density of a bulk sample is obtained and is measured again after a moderate degree of crushing. The sample is then progressively subdivided and the density measured and recorded with each subsequent crush. When the density figure tends to level off and no further change is noted upon subsequent crushing it may be assumed that all the pores have been eliminated and the last density figure is equal to the theoretical density for the product. The higher the density, the closer it approaches the theoretical density for that product and the better the grain for heavy duty grinding.

The actual recrystallization which takes place within the grains may be seen in a microscopic study of the fired grains. The grains may be crushed for this purpose until a transparent particle size is produced. The individual crystals may then be inspected and counted. It has been found that the grain produced in following my teaching shows a crystal growth equal to about twice the size of the starting particles in the original powder. Thus with a grain having an average particle size of 4 microns, an average crystal growth to 8 to 10 microns results when proper sintering has been done. Underfiring during sintering (too low a temperature, or less critically, firing for too short a time), results in smaller crystals and a poorly consolidated body. Overfiring produces an undue crystal growth and may cause bloating. It is believed that this control of recrystallization in following my teaching may be one of the factors that produces the surprising results noted.

Another characteristic of my product which gives information about its structure, is derived from the sandblast penetration test, which is really an impact abrasion test. A sample of a given product is subjected to the impact effect produced by blasting a given quantity of a specified sand against a surface of the product at a specified air pressure. The data obtained in my sandblasting tests are the results produced in either one, or two, or three, or four blasts, each blast being made with 253 cc. of standard silica sand (Ottawa) of 24 to 30 grit size blown through a ¼″ diameter nozzle with an air blast at 25 pounds per square inch pressure over a period of 30 seconds.

Since the grain sized product of my invention cannot be directly tested by this sandblast method in view of the relatively small size of the grains produced, I have made test discs 2″ in diameter out of the same powdered bauxite material, but fired in the same manner. The discs, in certain instances, may also be studied to give an indication of the linear shrinkage resulting from the firing step. Such discs may be subject to the above described sandblast penetration test after firing to determine the resistance of the fired product to impact abrasion. A good abrasive grain should show a penetration of less than .05 mm. and preferably as little at .00 to 0.02 mm. on the first shot. The first blast against the discs produced from the natural bauxite powder, as taught herein, shows less penetration than successive blasts indicating that the surface is harder or more resistant to impact abrasion than the interior. Thus it can be reasonably speculated that each of my individual grain sized masses has a harder surface or skin which is an important advantage in an abrasive product.

To show a comparison in hardness between any product and the hardness of a known substance, a piece of plate glass was subjected to the same sandblast test. The penetration on the first blast was 4.41 mm. as compared with 0.02 mm. on the first blast against my product. Thus it is apparent that a sintered product such as I have taught is approximately 220 times more resistant to sandblast penetration or impact abrasion than is plate glass.

*Example I*

In a typical example of the practice of my invention, I have taken a calcined Demerara bauxite and subjected it to a ball milling procedure. The ball milling operation was performed on crushed bauxite having a particle size of about 16 mesh and finer, the crushed material being formed into a slurry with equal weights of water and bauxite. A porcelain lined 30″ x 30″ mill was charged with about 600 lbs. of conventional high alumina balls and about 300 lbs. of slurry. The mill was rotated at about 35 r.p.m. for a period of 24 hours.

The resulting milled product when viewed in a Reichert projecting microscope and magnified about 1000 times appeared to have an average particle size of about 4 to 5 microns with very few particles larger than about 12 microns. It is believed, however, that many particles smaller than 1 micron were produced in the ball milling process, which sub micron sized particles could not be seen on the Reichert microscope.

The slurry was poured from the mill and dried in a 4″ to 5″ layer by evaporation at a temperature in the neighborhood of 85° C. This drying operation required about 48 hours and the resulting cake was easily crushed to a powder in a roll crusher.

The dry powder was placed in a suitable 7″ diameter cylindrical die and a pressure of 5 tons per square inch was exerted on the powder, there being several bumping steps to complete the pressing. A 1½″ thick cake resulted which was then stripped from the die.

The "green" cakes were placed on an oscillating screen and were repeatedly struck with a blunt instrument which was wielded manually so that the cakes were broken down into granules of a size to fall through the screen, thus obtaining a maximum yield with a minimum of unwanted fines. The granules were each comprised of an agglomeration of particles tightly pressed together. These agglomerated masses were then sized through a nest of screens and those passing through 6 mesh screen and retained on a 16 mesh screen were collected. The other sizes of "green" agglomerates were recycled.

The collected agglomerates were then brought up to a temperature of about 150° C. in an electric resistance furnace and were held soaking at this temperature for a period of 4 hours to sinter the agglomerates to produce the desired abrasive grains. The grains were held in the furnace on alumina batts or plates in layers about 4 inches deep. The individual grains tended to stick together as a result of the firing but were easily broken apart by manual pressing. A 2″ disk formed of this same Demerara powder and sintered at the same time in the furnace, was found to have a sandblast penetration at 25 #/sq. in. air pressure with 253 cc. of sand for 30 seconds ranging from .00 mm. on the first blast to .02 mm. on the second blast and .09 mm. on the third blast.

*Example II*

Another sample of crushed calcined bauxite was taken from a Surinam ore and subjected to the same procedure as described above in Example I. The calcined bauxite was crushed to about 16 mesh formed into a slurry and ball milled as above described for a period of 24 hours. The resulting powder as viewed on the Reichert microscope appeared to be of about 3 to 4 micron size but probably included many fines not seen on this instrument at 1000 times magnification. The dried powdered product from the ball mill was pressed under 5 tons per square inch pressure with several bumping steps to produce a 7″ in diameter disk about 1½″ thick. This agglomerated product was then broken down by being manually struck with a blunt instrument and the screened and sized agglomerates were sintered in an electric resistance furnace. The mass of granules of agglomerated particles was heated in a 4″ thick layer on an alumina batt to a temperature in the range of 1505° C. and then held soaking for a period of 3 hours. The resulting sintered abrasive grains were lightly stuck together but were easily broken apart one from another when removed from the furnace and cooled. These grains had a Pycnometric density of 3.722.

A 2″ disk formed of the same Surinam ore treated in an identical fashion and fired during the same sintering procedure was subjected to sandblast testing. The first blast showed a penetration of .01 mm., the second blast a penetration of .05 mm., and the third blast a penetration of .09 mm. This was the same sandblasting procedure such as was described above in Example I.

*Example III*

Another sample of my abrasive grain was made up with a mixture of equal parts by weight of Demerara, Surinam, Metal, and Domestic bauxites. The calcined and crushed bauxite was weighed out in equal quantities and thoroughly mixed. The resulting mixture was subjected to the same ball milling procedure described above in Example I. The microscopic study of the powder produced after 24 hours of ball milling indicated an average particle size of about 4 microns of those that could be seen on the Reichert microscope with one thousand times magnification. The ball milled powder was formed into a 1½″ thick by 7″ diameter disc under 5 tons per square inch pressure with several bumping steps. The resulting cake was fractured manually with a blunt instrument while simultaneously being subject to a screening operation and the screened and sized agglomerates were subject to sintering in an electric resistance furnace. The granules were brought to a temperature in the order of 1370° C. in the furnace and were then held soaking for a period of 4 hours. The resulting grains were found to have a Pycnometric density of 3.647.

A 2″ disk formed of a ball milled powder including in combination the Demerara, Surinam, Metal, and Domestic bauxites of this example and sintered simultaneously with the above described grains was tested by sandblast. This disk after a first blast was found to have an initial impact abrasion penetration of .02 mm., the second blast produced a penetration of .07 mm., and a third blast produced a penetration of .13 mm.

*Example IV*

In another example of the performance of my invention, a sample of Demerara bauxite was calcined and crushed and subjected to a wet ball milling operation for a period of 24 hours as described above in Example I. The average particle size visible on the Reichert microscope with one thousand times magnification appears to be about 4 to 5 microns. This powder was pressed under 5 tons per square inch with several bumping steps and again cakes of about 1½″ thickness and 7″ in diameter were broken down on an oscillating screen by a manual striking operation with a blunt instrument. The resulting granules of agglomerated particles were sized as described above in Example I.

The green agglomerated granules were then passed continuously through a rotary gas fired kiln. The granules were simultaneously tumbled and passed through the kiln from the inlet to the outlet end. The sintering zone of the kiln was maintained at a temperature of about 1570° C. and it is calculated that the agglomerates were retained in this zone for about 15 minutes.

The grains resulting from the processing had a Pycnometric density of 3.618. Since it was not possible to pass a 2″ disc through the rotary kiln it was impossible to produce a sample from the same powder used in this Example IV to determine the resistance of the product to impact abrasion as measured by the sandblast penetration.

The data tabulated below includes the examples described above and show other examples of the production of my abrasive grain from several different types of bauxites together with the density of the resulting product and in certain cases the sandblast penetration measurements.

TABLE II

The observations recorded in this table are the result of visual and microscopic study of typical grains produced in following this invention.

MEGASCOPIC PROPERTIES

| Sample | Grain Color | Condition of Surface |
|---|---|---|
| Surinam | Grayish-Tan | Smooth. |
| Domestic | Reddish-Brown | Do. |
| Metal | do | Do. |
| Arkansas | Medium-Tan | Slightly Rough. |

MICROSCOPIC PROPERTIES

| Sample | Crystal Size in Microns | Crystal Shape | Porosity | Crystal Orientation | Constituents X-ray Identified | Remarks | Strain |
|---|---|---|---|---|---|---|---|
| Surin | 15 | Short laths—Few ascicular. | Essentially Zero. | Random | $\alpha$-$Al_2O_3$, $3Al_2O_3 \cdot 2SiO_2$. | Fine-grained dense mosaic. | Common. |
| Domes | 12–135 | Lath-shape predominates. | | do | $\alpha$-$Al_2O_3$, $3Al_2O_3 \cdot 2SiO_2$. | Particle size quite heterogeneous Reddish-Brown. | In larger xtals. |
| Metal | 8–24 | 50/50 Laths and Equidimensional. | | do | $\alpha$-$Al_2O_3$, $3Al_2O_3 \cdot 2SiO_2$. | 80-grit grains are fairly transparent. Opaque only at very center. Yellowish-Brown. | In larger xtals. Magnetic material. |
| Arkans | 9–25 | do | | do | $\alpha$-$Al_2O_3$, $3Al_2O_3 \cdot 2SiO_2$. | Slightly more opaque than metal 1410. Yellowish-Brown. | In larger xtals. |

TABLE III–A

The grinding results accomplished by incorporating grains produced in following my invention in hot pressed resinoid snagging wheels which are otherwise of conventional manufacture, are presented here. Two wheels designated A in the table below were run in a steel mill under actual billet snagging grinding operations in comparison with a standard or conventional snagging wheel designated B and used for this grinding operation. The three wheels were run on a Midwest 60 H.P. swing frame type of snagging grinder at a pressure of 525 lbs. for the standard wheel and 540 lbs. for wheels with my improved grain. The wheels were operated at a reasonably constant speed of from 9,500 to 11,000 surface feet per minute. The billets being ground were 18–8 and 17–7 stainless steel and the wheels were of initially 24″ x 3″ x 12″.

TABLE I

| Type of Bauxite | Average Particle Size, Microns Seen on Reichert Microsc. 1,000 X | Type of Milling | Time of Milling, Hr. | Forming Process | Furnace Type | Sinter Temp., °C. | Soak Time, Hrs. | Linear Firing, Shr. percent | Density Pyc. G, Gm./cc. | Successive Sand Blast Penetrations, Produced at 25 #/sq.in. with 253 cc. sand for 30 Seconds |
|---|---|---|---|---|---|---|---|---|---|---|
| Arkansas | 4 | Wet Ball | 24 | Extrusion | Electric Resistance. | 1,400 | 4 | 23 | 3.672 | [1] 0.02 |
| Do | ca. 4 | do | | Stokes Press Preformed 3/16″ Pellets. | do | 1,420 | 4 | | 3.671 | |
| Demerara | 4–5 | do | 24 | Preform 5 t.p.s.i | do | 1,560 | 4 | 19.6 | [2] 3.605 | .00—0.02—0.09 |
| 50% Demer / 50% Surin | 4 | do | 24 | do | do | 1,560 | 4 | 19.7 | [2] 3.634 | .02— .07— .21 |
| Surinam | 3–4 | do | 24 | do | do | 1,505 | 3 | 22.5 | [2] 3.722 | .01— .05— .09 |
| 25% Demer / 25% Surin / 25% Metal / 25% Domes | 4 | do | 24 | do | do | 1,370 | 4 | 17.8 | [2] 3.647 | .02— .07— .13 |
| 50% Surin / 50% Metal Grade | 4.5 | do | 24 | do | do | 1,490 | 4 | 18.8 | [2] 3.577 | .01— .04— .12 |
| Demerara | 4–5 | do | 24 | do | Rotary Kiln Gas-Fired. | 1,570 | [3] | | [2] 3.618 | |

[1] 2 shots.
[2] Det'n on 14 Grit Size.
[3] Ca. 15 min.

| Wheel Lot | Wheel No. | Wheel Life, Hours | Metal Removal, lbs./wheel | Wheel Cost per Pound of Metal Removed |
|---|---|---|---|---|
| A | 1 | 12.2 | 1,840 | .033 |
| A | 2 | 10.7 | 1,610 | .037 |
| B | 1 | 5.9 | 1,005 | .060 |

These data show that wheels with my abrasive grain therein had nearly 200% longer wheel life and removed about 175% more metal when compared with a standard. It was concluded that wheels with my abrasive were more durable, produced less dust and required fewer wheel changes.

TABLE III–B

Additional tests have been performed which show comparative data between prior art snagging wheel constructions and the grinding ability of wheels which include abrasive grain made in accordance with this invention. These tests were run on a laboratory grinder adapted to drive the wheels at 9,500 s.f.p.m. while applying a pressure of 400 pounds. Stainless steel billets were ground during two 15 minute runs per wheel. The respective abrasive compositions were tested in resin bonded snagging wheels 16" in diameter and 2" wide with a 6" aperture in the center. Typical examples gave the following results:

| Abrasive | Wheel Wear, Cu. In. per Hr. | Material Removal, lbs. per Hr. | Grinding Quality, percent | Total Gross Power, kw. |
|---|---|---|---|---|
| Aluminum Oxide A | 100 | 100 | 100 | 12.8 |
| Aluminum Oxide B | 76 | 91 | 110 | 11.4 |
| Crushed Sintered Bauxite (Coes) | 63 | 93 | 135 | 12.2 |
| Preformed Sintered Bauxite | 73 | 139 | 265 | 14.8 |

Aluminum oxide A was a conventional fused alumina abrasive graded to simulate the size range and shape of the grains produced by crushing a sintered bauxite brick produced in following the prior art Coes teaching. Aluminum oxide B is a conventionally fused alumina snagging grain such as is used in conventional snagging wheels, the grain having a stronger shape and slightly different particle size distribution as compared with the A product. The crushed sintered bauxite (Coes) which was used in the tests described above, was produced as taught in the mentioned Coes patent, wherein a sintered brick of natural bauxite material was crushed and the resulting grain screened and blended to form a snagging abrasive.

The preformed sintered bauxite was made in accordance with the preferred teaching herein.

Grinding quality is a factor which has been found to give a true indication of the comparative quality of grinding wheels and is derived from the formula: grinding quality is equal to the square of the figure representing the pounds of material removed per hour divided by the figure representing the wheel wear in cubic inches per hour.

The above data show that the wheels made with the preformed sintered bauxite product of this invention gives considerably greater removal of material proportionate to the wheel wear as compared with either the crushed sintered bauxite (Coes) product or the regular aluminum oxide abrasive used in the present day commercial snagging grinding wheels. The improvement in comparative grinding quality is approximately 165% better than the conventional snagging wheel and shows an approximate 100% improvement over the Coes type of crushed sintered bauxite abrasive product.

Certain of the characteristics of my improved grain have been described above and data relating thereto tabulated, see particularly in Table II. It should be noted, however, that the individual grains have a smooth surface that may vary in color depending upon the chemical composition of the grain and the kind of atmosphere surrounding the grain during the sintering step. When the above described bauxites are sintered in an electric resistance furnace in the presence of normal atmospheric air, the skin of the grains will vary in color from grayish-tan to reddish-brown. A gas fired furnace on the other hand may produce a different surface coloring.

Also the glassy phase impurities normally found in most natural bauxites will be found in an intersticial relation to the crystals forming the grain. This is a striking characteristic of my sintered product which has a uniform internal appearance to the naked eye when broken open as compared with the columnar glassy phase distribution in similar bauxite materials which have been fused.

The above data of Table II also show the interlocking lath crystalline structure produced by sintering to effect recrystallization. The lath or needle-like crystals are combined in some of the grains with equidimensional crystals to form a crystalline picture quite distinct from the columnar crystals of a fused product.

In conclusion it should be noted, in view of the description included herein that, an abrasive grain product can be produced without the usual production of fines that may become a waste product. In following my invention the grains are formed in the green state directly to size so that the best distribution of grain sizes can be produced as desired. Further, such grain size distribution can be produced without the crushing of a hard abrasive material such as has always been the practice heretofore. This is an advantage in itself but in addition leads to the production of a better product by eliminating a possibility of weakening the grain which may result from the actual crushing of the fired abrasive to produce a fine grained product such as is required in following the teaching of the Coes patent and other prior art teachings.

The description and examples given above are intended to illustrate the best mode of performing my invention. It is apparent that many modifications thereof may occur to those skilled in the art, which will fall within the scope of the following claims.

I claim:

1. A method of making abrasive grain from calcined bauxite material comprising reducing the material to a fine powder, compacting under affirmative pressure and forming the fine particles of said powder into grain sized agglomerations, and sintering said agglomerations of particles at a temperature below the fusion temperature of the bauxite to induce limited recrystallization of said particles, whereby to produce abrasive grains directly to size.

2. A method of making abrasive grain from calcined bauxite material comprising reducing the material in size so that a large percentage thereof will fall within a range of particle size of approximately 1 to 12 microns with most of the remainder being less than about 1 micron in size, applying approximately 5 tons per square inch pressure to masses of the particles and forming grain sized agglomerations thereof, and sintering said agglomerations of particles at a temperature below the fusion temperature of the bauxite to induce limited recrystallization of said particles, whereby to produce abrasive grains directly to size.

3. A method of making abrasive grain from calcined bauxite material comprising reducing the material to a fine powder, applying approximately 5 tons per square inch pressure to masses of particles of said powder and forming grain sized agglomerations thereof, and sintering said agglomerations of particles at a sintering temperature below the fusion temperature of the bauxite and for a time period related to the temperature to induce limited recrystallization of said particles, whereby to produce abrasive grains directly to size.

4. A method of making abrasive grain from calcined bauxite material comprising reducing the material to a fine powder, applying approximately 5 tons per square inch pressure to masses of particles of said powder and forming grain sized agglomerations thereof, and sintering said agglomerations of particles at a temperature below the fusion temperature of the bauxite and within the range of from about 1370° C. to 1570° C. and for a time period of from four hours to fifteen minutes, whereby to induce limited recrystallization of said particles in order to produce abrasive grains directly to size.

5. A method of making abrasive grain from calcined bauxite material comprising reducing the material in size so that a large percentage thereof will fall within a range of particle size of approximately 1 to 12 microns and will have an average particle size of about 4 to 5 microns with most of the remainder being less than about 1 micron in size, applying approximately 5 tons per square inch pressure to masses of the particles and forming grain sized agglomerations thereof falling within the range of from about 6 to 16 mesh, and sintering said agglomerations of particles at a temperature below and fusion temperature of the bauxite and within the range of from about 1370° C. to 1570° C. and for a time period of from four hours to fifteen minutes, whereby to induce limited recrystallization of said particles having most crystals falling within a range between about 8 to 25 microns to produce abrasive grains directly to size.

6. A method of making an abrasive grain from a calcined natural bauxite material comprising ball milling the material to reduce it in size so that approximately 95% will fall within a range of particle size of approximately 1 to 12 microns having an average size of about 4 to 5 microns with most of the remainder being less than about 1 micron in size, compacting the particles to form a green brick, crushing the green brick to form grains, screening the grains, collecting those grains falling within the range of 6 to 16 mesh, and sintering the collected grains at a temperature below the fusion temperature of the bauxite to induce limited recrystallization of said particles within each of the grains whereby to produce abrasive grains directly to size that are even textured throughout and relatively free of voids.

7. A method of making an abrasive grain from a calcined natural bauxite material comprising reducing the material to an average particle size of 5 microns with most of the particles falling within a range of particle size of approximately 1 to 12 microns, applying approximately 5 tons per square inch pressure to masses of the particles and forming grain sized agglomerations thereof, and sintering said grain sized agglomerations of particles at a sintering temperature below the fusion temperature of the bauxite and for a time period long enough to induce limited recrystallization of said particles within each of the grains, the crystals varying from about 8 to 10 microns to about 25 microns in size for the most part, whereby to produce abrasive grains finished directly to size that are even textured throughout, fine grained, and relatively free of voids.

8. A method of making an abrasive grain from a calcined natural bauxite comprising reducing to a fine powder, compacting and forming grain sized agglomerations of the particles of said powder, continuously feeding said grain sized agglomerations of particles to a rotary kiln having a sintering zone, and tumbling said agglomeration of particles while sintering said agglomerations of particles at a temperature within the range 1370° C. to 1570° C. for a period of approximately 15 minutes, the temperature being below the fusion temperature of the bauxite to induce limited recrystallization of said particles within each of the grains whereby to produce abrasive grains of predetermined size.

9. A method of making an abrasive grain from a calcined natural bauxite comprising reducing the bauxite in size so that approximately 95% will fall within a range of particle size of approximately 1 to 12 microns with the average particle being of the order of about 5 microns, compacting and forming grain sized agglomerations of said particles falling within the range of 6 to 16 mesh, continuously feeding said grain sized agglomerations of particles to a rotary kiln having a sintering zone, and sintering said agglomerations of particles at a temperature sufficiently high but yet below the fusion temperature of the bauxite and for a time period long enough to induce limited recrystallization of said particles within each of the grains whereby to produce abrasive grains directly to size that are even textured throughout and relatively free of voids.

10. A method of making an abrasive grain from a calcined natural bauxite comprising reducing the bauxite in size so that approximately 95% will fall within a range of particle size of approximately 1 to 12 microns with the average particle being of the order of about 5 microns, compacting and forming grain sized agglomerations of said particles, continuously feeding said grain sized agglomerations of particles to a rotary kiln having a sintering zone, and sintering said agglomerations of particles at the optimum sintering temperature for the bauxite and below the fusion temperature of the bauxite and for a time period of about 15 minutes to induce limited recrystallization of said particles within each of the grains whereby to produce abrasive grains directly to size that are even textured throughout and relatively free of voids.

11. An abrasive grain material resulting from the sintering of a calcined natural bauxite which material may be used for snagging operations and the like comprising preformed sintered grains of the natural bauxite having a skin produced by sintering the individual grains, each grain having a random crystal orientation therein, a large proportion of the crystals being in the order of from about 5 microns to 30 microns in size, approximately 50% of said crystals having a lath and 50% having an equidimensional shape, said grains being even textured throughout and composed of $\alpha Al_2O_3$, $3Al_2O_3 \cdot 2SiO_2$ as identified by their X-ray patterns, and glass, said glass being present in an intersticial relation to the other components, and said grain having a substantially zero porosity.

12. An abrasive grain material in accordance with claim 11 wherein each grain has an irregular rounded shape.

13. A grinding wheel for snagging stainless steel billets and the like comprising abrasive grains in accordance with claim 11 held disposed and supported in a resin bond.

14. A grinding wheel for snagging stainless steel billets and the like comprising abrasive grains according to claim 12 held disposed and supported in a resin bond.

References Cited in the file of this patent

UNITED STATES PATENTS

| 1,756,425 | Frary | Apr. 29, 1930 |
| 2,725,286 | Coes | Nov. 29, 1955 |

UNITED STATES PATENT OFFICE
CERTIFICATE OF CORRECTION

Patent No. 3,079,243 February 26, 1963

Herbert F. G. Ueltz

It is hereby certified that error appears in the above numbered patent requiring correction and that the said Letters Patent should read as corrected below.

Column 7, line 62, for "150° C." read -- 1560° C. --; column 13, line 21, for "and" read -- the --.

Signed and sealed this 14th day of January 1964.

(SEAL)
Attest:
ERNEST W. SWIDER

EDWIN L. REYNOLDS

Attesting Officer

Acting Commissioner of Patents